(12) United States Patent
Kohlmeier et al.

(10) Patent No.: US 12,168,742 B2
(45) Date of Patent: Dec. 17, 2024

(54) PERFORATED MASKING TAPE

(71) Applicants: Rachel Carol Kohlmeier, Winneconne, WI (US); Jake Kohlmeier, Winneconne, WI (US)

(72) Inventors: Rachel Carol Kohlmeier, Winneconne, WI (US); Jake Kohlmeier, Winneconne, WI (US)

( * ) Notice: Subject to any disclaimer, the term of this patent is extended or adjusted under 35 U.S.C. 154(b) by 0 days.

(21) Appl. No.: 17/560,864

(22) Filed: Dec. 23, 2021

(65) Prior Publication Data
US 2023/0332018 A1    Oct. 19, 2023

Related U.S. Application Data (60) Provisional application No. 63/131,177, filed on Dec. 28, 2020.

(51) Int. Cl.
*C09J 7/21* (2018.01)
*C09J 7/40* (2018.01)

(52) U.S. Cl.
CPC . *C09J 7/21* (2018.01); *C09J 7/40* (2018.01); *C09J 2203/37* (2020.08); *C09J 2301/18* (2020.08); *C09J 2301/302* (2020.08); *C09J 2301/50* (2020.08)

(58) Field of Classification Search
CPC ... C09J 7/21; C09J 7/40; C09J 2203/37; C09J 2301/18; C09J 2301/302; C09J 2301/50; C09J 2203/31; C09J 2400/283
See application file for complete search history.

(56) References Cited

U.S. PATENT DOCUMENTS

| | | | | |
|---|---|---|---|---|
| 6,635,334 | B1* | 10/2003 | Jackson | B32B 3/10 428/137 |
| 2011/0274920 | A1* | 11/2011 | Van Doorselaer | D21H 19/12 428/352 |
| 2015/0298155 | A1* | 10/2015 | Sackler | B05B 12/24 428/43 |

(Continued)

FOREIGN PATENT DOCUMENTS

JP    H07303851 A  * 11/1995

OTHER PUBLICATIONS

JPH07303851A Machine Translation of Description (Year: 2023).*

*Primary Examiner* — Cynthia L Schaller
(74) *Attorney, Agent, or Firm* — Jose Jimenez; Robert Cantrell (57) ABSTRACT

The inventive perforated tape is a masking tape that has an elongate tape member further having a polymer coating top layer, a biodegradable paper mask layer middle layer, and a biodegradable polymer perforated lining member contiguously coupled to a bottom surface of the paper mask layer, a plurality of hole members parallelly disposed laterally and longitudinally substantially covering the entire polymer perforated lining member. The polymer perforated lining member further includes a plurality of solid portions of the polymer perforated lining member disposed laterally and longitudinally between the plurality of hole members adapted to resist tear so the elongate tape member tears substantially perpendicularly to longitudinal sides of the elongate tape member along a user-selected one row of a plurality of linear rows of hole members. An adhesive compound is disposed substantially on the entire bottom surface of the perforated lining member.

14 Claims, 7 Drawing Sheets

(56) References Cited

U.S. PATENT DOCUMENTS

2016/0160088 A1\* 6/2016 Yen ............................ C09J 7/20
                                                          428/43
2019/0233680 A1\* 8/2019 Liu ............................ C09J 7/22

\* cited by examiner

PERFORATED MASKING TAPE

CLAIM OF PRIORITY

This application claims the benefit of and priority to U.S. Provisional Application with Ser. No. 63/131,177, filed on Dec. 28, 2020, with the same title, the contents of which are hereby incorporated by reference in its entirety.

FIELD OF THE INVENTION

The inventive concept relates generally to a perforated masking tape.

BACKGROUND

Currently, there are a number of solutions for a detachable covering or shielding painting tape that protects adjacent surfaces being painted or treated. One of these solutions attempts to utilize clear or transparent packing tape, but this solution fails to meet the needs of the market because clear packing tape is hard to place and remove cleanly from a surface (without damaging the underlying surface) when painting. Another solution attempts to not use tape, but instead a portable shielding device or spatula-type member that is held in one hand while painting with the other. Unfortunately, this solution is similarly unable to meet the needs of the market because painting with the free hand while holding the shield member is cumbersome and inefficient when painting large areas. Further, current forms of masking tape in the market, although tearable by hand, do not tear evenly from the dispenser roll or may tear prematurely from the roll, disrupting or prolonging the masking process before painting or treating a certain area with paint. Therefore, there currently exists a need in the market for an improved tape for masking certain surfaces that is easy to apply as well as peel off walls and windows when the painting project is complete.

SUMMARY OF THE INVENTION

The inventive concept, in one example embodiment, is a masking tape that has an elongate tape member further having a polymer coating top layer, a paper mask layer contiguously coupled by a top surface of the paper mask layer to an inner layer of the polymer coating top layer, and a polymer perforated lining member contiguously coupled to a bottom surface of the paper mask layer, a plurality of hole members parallelly disposed laterally substantially the width of, and longitudinally substantially the length of, the elongate tape member substantially covering the entire polymer perforated lining member. The polymer perforated lining member further includes a plurality of solid portions of the polymer perforated lining member disposed laterally and longitudinally between the plurality of hole members designed to resist tear so the elongate tape member tears substantially perpendicularly to longitudinal sides of the elongate tape member along a user-selected one row of a plurality of linear rows of hole members. An adhesive compound is disposed substantially on the entire bottom surface of the perforated lining member.

In a related example embodiment, the masking tape includes a paper mask layer with a plurality of perforated hole members parallelly disposed laterally substantially the width of the elongate tape member. The paper mask layer is then coupled to a lining layer and to a adhesive compound disposed substantially on the entire bottom surface of the perforated lining member. The lateral perforations on the paper mask layer are designed to tears to t ha the elongate tape member tears perpendicularly to longitudinal sides of the elongate tape member along a user-selected one row of plurality of linear rows of hole members.

In one example embodiment of the described masking tape, at least forty aligned hole members per inch of the polymer perforated lining member including a set of linear rows of hole members running substantially the width of the elongate tape member.

Masking tape, also known as painter's tape, is a type of pressure-sensitive tape normally made of a thin and easy-to-tear paper, and an easily released pressure-sensitive adhesive. It is available in a variety of widths. It is used mainly in painting, to mask off areas that should not be painted. The adhesive is the key element to its usefulness because it allows the tape to be easily removed without leaving residue or damaging the surface to which it is applied. Masking tape is typically available in several strengths, rated on a 1-100 scale based on the strength of the adhesive. Most painting operations will require a tape in the 50 range. Household masking tape may be made of an even weaker paper and lower-grade adhesive. The inventive perforated tape may include these strength ranges.

Some embodiments may use biodegradable polymers. Biodegradable polymers are a special class of polymer that breaks down after its intended purpose by bacterial decomposition process to result in natural byproducts such as gases ($CO_2$, $N_2$), water, biomass, and inorganic salts. These polymers are found both naturally and synthetically made, and largely consist of ester, amide, and ether functional groups. Their properties and breakdown mechanism are determined by their exact structure. These polymers are often synthesized by condensation reactions, ring opening polymerization, and metal catalysts. There are vast examples and applications of biodegradable polymers. The inventive perforated tape may use such polymers as appropriate to the user need being supported.

It would be advantageous to have a masking tape that is perforated. Furthermore, it would be advantageous to have a masking tape that is durable. Still further, it would be advantageous to have a masking tape that is removeable.

The inventive perforated tape advantageously fills the aforementioned deficiencies by providing masking tape, which provides a quick way to compensate for painting inaccuracies.

The described masking tape, in one embodiment, has a perforated coating. In this example embodiment, the described masking tape has a paper mask layer, which fulfills the need for removable tape. In another embodiment, the masking tape has a perforated paper layer.

Among other things, it is an advantage of the inventive perforated tape to provide masking tape that does not suffer from problems or deficiencies associated with prior solutions.

It is still further an advantage of the inventive perforated tape to be durable. Still further, the described masking tape has a poly coating. The embodiments described herein are applicable to stronger tape products such as duct tape, packing tape or medical tape which may still require or need hand-tearing in some cases.

The inventive concept now will be described more fully hereinafter with reference to the accompanying drawings, which are intended to be read in conjunction with both this summary, the detailed description and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring to the figures, FIGS. 1-5B illustrate that the inventive perforated tape device 10 includes a masking tape embodiment that is in dispensable roll form includes an elongate tape member 100 configured from a polymer coating top layer 110, a paper mask layer 150 coated by polymer coating layer 110 or contiguously coupled at a top surface 151 of the paper mask layer 150 to an inner layer 119 of the polymer coating top layer 110, and a polymer perforated lining member 190 covering or contiguously coupled to a bottom surface 159 of the paper mask layer 150. In this example embodiment, and referring to more specifically to FIGS. 4 and 5A-5B, polymer lining member 190 includes a plurality of hole members (or perforations) 200 parallelly disposed laterally substantially the width of, and longitudinally substantially the length of, mask layer 150 and substantially covering the entire polymer perforated lining member 190. Further, the elongate tape member 100 when in dispensable roll form having polymer perforated lining member 190 substantially covering the entire length of the tape member 100.

Figure 1:
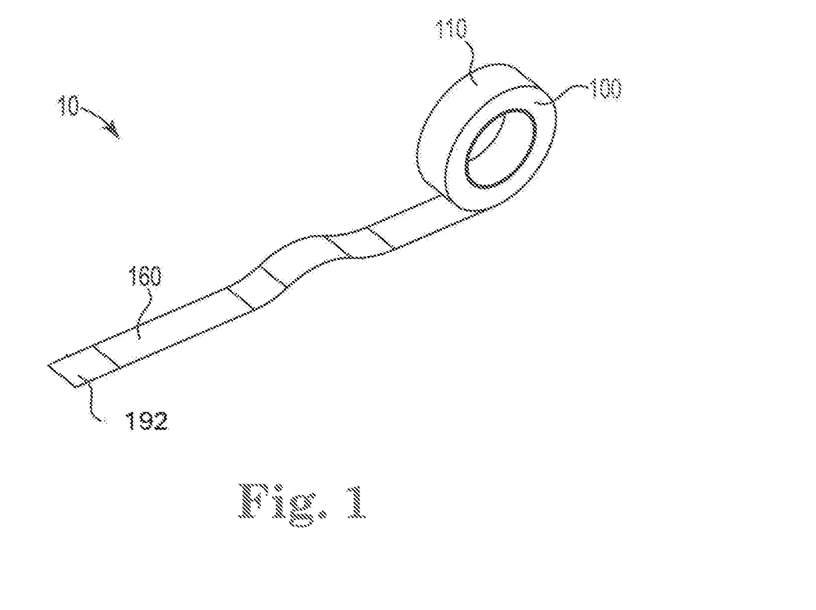
FIG. 1 illustrates a perspective view of the inventive perforated masking tape.
Figure 2:
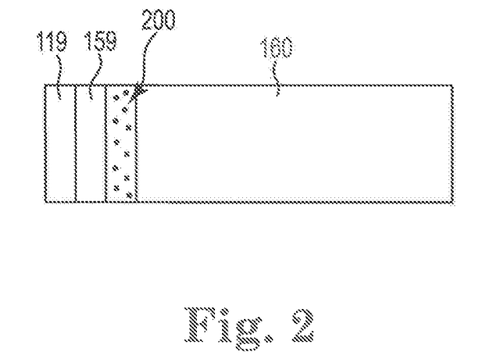
FIG. 2 illustrates a view of broken away layers of the inventive perforated tape.
Figure 3:
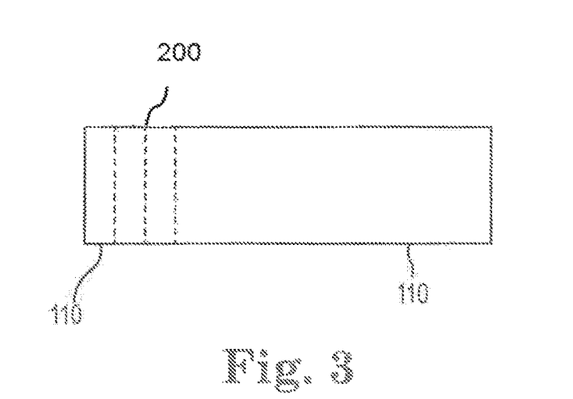
FIG. 3 illustrates a view of broken away layers of the inventive perforated tape.
Figure 4:
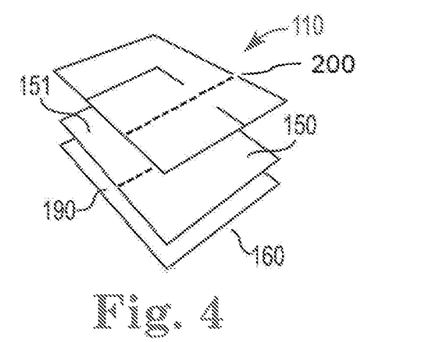
FIG. 4 illustrates various views of a set of the layers of the inventive perforated tape.
Figure 5A:
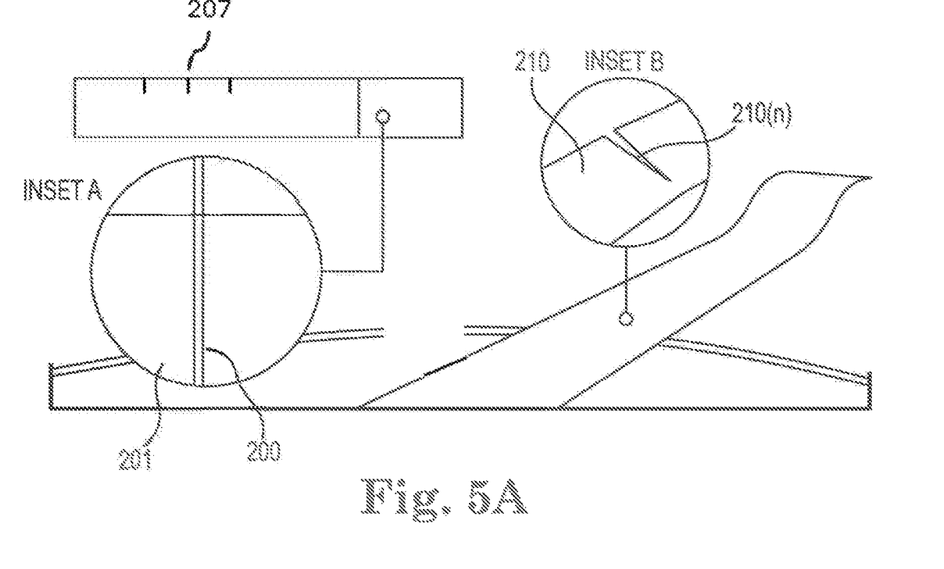
FIGS. 5A-5B illustrate one of a polymer lining member or paper layer with a plurality of perforated hole members.
Figure 5B:
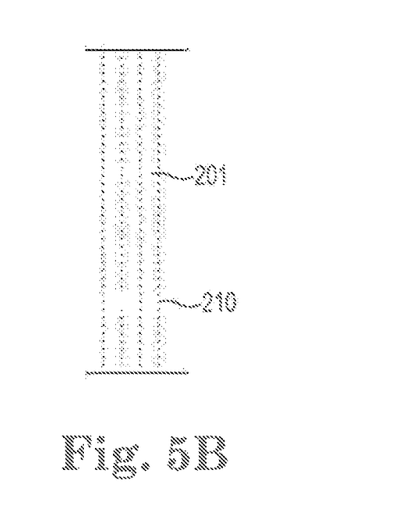

In this example embodiment, polymer perforated lining member 1190 further includes a plurality of solid portions 201 of the polymer perforated lining member 190 disposed laterally and longitudinally between the plurality of hole members 200 designed to resist tear so the elongate tape member 100 tears substantially perpendicularly to longitudinal sides of the elongate tape member 100 along a user-selected one row 210 (n) of a plurality of linear rows of hole members 210. An adhesive compound 160 is disposed substantially on an entire bottom surface of the perforated lining member 190.

In one embodiment of the described masking tape, at least forty aligned hole members per inch of the polymer perforated lining member 190 comprise each laterally disposed linear row of hole members 210 running substantially the width of the elongate tape member.

Figure 6:
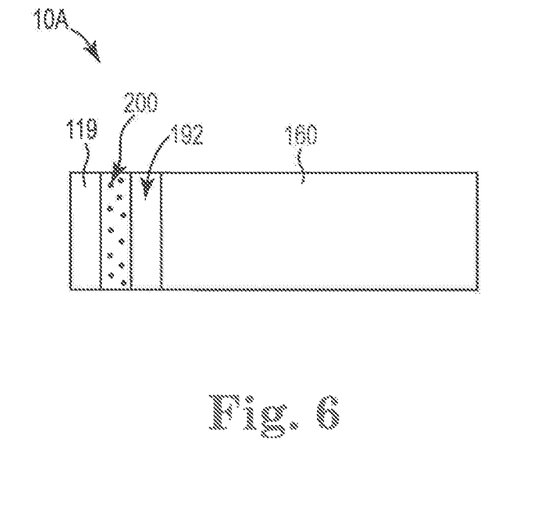
FIG. 6 illustrates broken away layers of a second embodiment of the perforated masking tape.

Referring now to FIGS. 4-6, in another related embodiment, a hand-tearable masking tape 10A includes a polymer coating top layer 110 and a paper mask layer 150 having a top surface 151 with polymer coating top layer 110 being disposed thereon, the paper mask layer 150 having a predefined width and a predefined length and including a plurality of hole members 200 protruding entirely through the paper mask layer 150 (but not through the adjacent polymer lining member 190). In this example embodiment, paper mask layer 150 further includes a plurality of solid portions 201 (each with predefined lengths to provide additional strength) configured to resist an inadvertent tear so the paper mask layer 150 tears along the mask layer width of a line of hole members 210. Adjacent is located a polymer lining member 190 coupled to a bottom surface 159 of the paper mask layer 150 which also provides additional strength to paper mask layer 150 to prevent inadvertent tearing as the elongate tape 100 is pulled or extended from the dispensable roll. Finally, an adhesive compound layer 160 is disposed on the bottom surface 192 of the polymer lining member 190. The advantage of this example embodiment of the hand-tearable tape 10A is that there is no "bleed through" since the holes or perforations 200 are now only through the mask layer 150 and/or polymer film layer 190 (as an option) and not through adhesive layer 160. This also ensures that the elongate tape 100 does not tear while being pulled or peeled off the roll, hence making this embodiment manufacturable utilizing standard material, tooling, and equipment.

Figure 7:
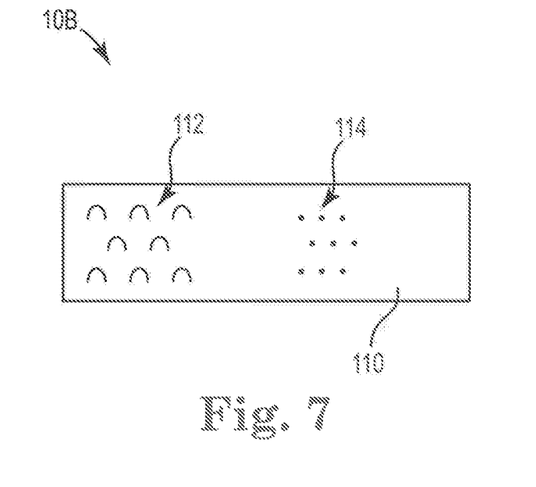
FIG. 7 illustrates a top view of an embodiment of the perforated masking tape having a top polymer coating layer with formations for impeding liquid flow.

In yet another related embodiment, and referring to FIG. 7, there is illustrated a top view of an embodiment of the perforated masking tape 10B having a top polymer coating layer 110 with formations for impeding liquid flow. In particular, there is provided a masking tape 10B and a method of forming a hand-tearable masking tape 10B including the steps of providing a paper mask layer 150 having a top surface 151 and a bottom surface 159, the paper mask layer 150 having a predefined width and a predefined length. The method includes forming a plurality of hole members 200 protruding entirely through the paper mask layer 150, with the paper mask layer further including a plurality of solid portions 201 designed to resist tear so the paper mask layer tears along the width of a line of hole members 210. The method includes the step of coating the top surface 151 of the paper mask layer 150 with a polymer coating top layer 110 and providing a polymer lining member 190 coupled to the bottom surface 159 of the paper mask layer. The method also includes the step of providing or forming an adhesive compound layer 160 on a bottom surface 192 of the polymer lining member 190.

In a related embodiment, the method includes forming the polymer coating layer 110 with a plurality (random or equidistantly defined) micro-nubs or micro-indents 112 to impede paint or solvent from running or dripping off the tape 100. In this example embodiment, lateral ribs or small nubs (or microribs or micronubs) 112 are in an offset pattern to ensure direct channels are not formed to facilitate dripping or running of paint or solvent. In another related embodiment, the polymer coating layer is formed with microparticles 114 to create an abrasive or rough or uneven surface to also impede paint or solvent from running or dripping off the tape. In this example embodiment, microparticles 114 are in an offset pattern to ensure direct channels are not formed to facilitate dripping or running of paint or solvent.

In yet another embodiment, the at least one of the polymer coating layer 110 and the paper mask layer 150 include a plurality of equally spaced markings 207 configured to provide a user a measurement aid or tool (similar to a tape measure) when the tape is extended from the roll and applied to a wall or other surface.

In various embodiments, the pressure sensitive adhesives require a delicate balance of viscous and elastic properties which result in a four-fold balance of adhesion, cohesion, stretchiness and elasticity. Pressure-sensitive adhesives generally comprise elastomers which are either inherently tacky, or elastomers or thermoplastic elastomers which are extended with the addition of tackifying resins and plasticizing oils. They can be coated in solvent or as water-based emulsions to reduce the material viscosity to a level that is easily applied to the backing composite of the tape. An adhesive composition that is preferably comprised of a blend of an acrylic pressure-sensitive adhesive and a thermoplastic elastomer. The adhesive composition comprises at least 5 weight percent adhesive and the composition has a morphology comprising at least two distinct domains, a first domain being substantially continuous in nature and a second domain being fibrillose to schistose in nature parallel to the major surface of the adhesive within said first domain. Optionally, the adhesive is comprised of a blend of an acrylic pressure-sensitive adhesive and an elastomer and a tackifier, the composition comprising at least 5 weight percent adhesive and the composition having a morphology comprising at least two distinct domains, a first domain being substantially continuous in nature and the second domain being fibrillose to schistose in nature parallel to the major surface of the adhesive within the first domain. Major classes of pressure-sensitive adhesives useful for preparing the tape of the invention include but are not limited to natural rubbers; synthetic rubbers such as butyl rubber, and linear, radial, star, branched and tapered block copolymers such as styrene-butadiene, styrene-ethylene/butylene and styrene-isoprene; acrylics, especially those having long chain alkyl groups; and silicones.

The following patents and publications are incorporated by reference in their entireties: U.S. Pat. Nos. 5,985,775; 9,095,877; 9,550,877; and US Pub. 20080286533M.

While the inventive perforated tape has been described above in terms of specific embodiments, it is to be understood that the inventive perforated tape is not limited to these disclosed embodiments. Upon reading the teachings of this disclosure many modifications and other embodiments of the inventive perforated tape will come to mind of those skilled in the art to which this inventive perforated tape pertains, and which are intended to be and are covered by both this disclosure and the appended claims. It is indeed intended that the scope of the inventive perforated tape should be determined by proper interpretation and construction of the appended claims and their legal equivalents, as understood by those of skill in the art relying upon the disclosure in this specification and the attached drawings.

The invention claimed is:

1. A hand-tearable masking tape comprising:
a polymer coating top layer;
a paper mask layer having a top surface with the polymer coating top layer being disposed thereon, the paper mask layer having a predefined width and a predefined length and including a plurality of hole members protruding entirely through the paper mask layer, the paper mask layer further including a plurality of solid portions adapted to resist tear so the paper mask layer tears along a width of a line of hole members; a polymer lining member coupled to a bottom surface of the paper mask layer;
an adhesive compound disposed substantially on a bottom surface of the polymer lining member; wherein the polymer coating top layer includes a plurality of hole members extending to and aligned with the plurality of hole members that protrude entirely through the paper mask layer, the aligned plurality of hole members extending through the polymer coating top layer, through the paper mask layer, and at least up to the polymer lining member.

2. The hand-tearable masking tape of claim 1 wherein the combination paper mask layer, the polymer lining member and the adhesive are configured to have a sufficient length to form an elongate tape member in a dispensable roll configuration.

3. The masking tape of claim 1 wherein the plurality of holes are configured in linear rows of hole members spanning the width of the paper mask layer such that the solid portions of the paper mask layer are located therebetween, thereby facilitating the tearing of the paper mask layer substantially perpendicularly to longitudinal sides of the paper mask layer along a user-selected one of the linear rows of hole members.

4. The masking tape of claim 1 wherein the adhesive compound is a pressure sensitive adhesive.

5. The masking tape of claim 1 wherein the polymer coating layer is formed on the paper mask layer to include a plurality of micro-ribs or micro-nubs to inhibit a lateral flow of a liquid or fluid substance across the polymer coating layer.

6. The masking tape of claim 5 wherein the liquid substance is selected from a group consisting of paint, solvent, or water.

7. The masking tape of claim 1 wherein the polymer coating layer includes a plurality of microparticles to inhibit a lateral flow of a liquid or fluid substance across the polymer coating layer.

8. The masking tape of claim 1 wherein at least one of the polymer coating layer and the paper mask layer include a plurality of equally spaced markings adapted to provide a user a measurement aid or tool.

9. The masking tape of claim 3 wherein at least forty aligned hole members per inch of the paper mask layer comprise each laterally disposed linear row of hole members running substantially the width of the elongate tape member.

10. A method of forming a hand-tearable masking tape comprising the steps of:
providing a paper mask layer having a top surface and a bottom surface, the paper mask layer having a predefined width and a predefined length;
providing a polymer lining member coupled to the bottom surface of the paper mask layer;
coating the top surface of the paper mask layer with a polymer coating top layer;
forming a plurality of hole members protruding entirely through the polymer top coating layer and the paper mask layer, the hole members extending at least to the polymer lining member, the paper mask layer further including a plurality of solid portions adapted to resist tear so the paper mask layer tears along a width of a line of hole members; and providing an adhesive compound on a bottom surface of the polymer lining member.

11. The method of claim 10 further comprising the step of configuring the plurality of holes in linear rows of hole members spanning the width of the paper mask layer such the solid portions of the paper mask layer are located therebetween, thereby facilitating the tearing of the paper mask layer substantially perpendicularly to longitudinal sides of the paper mask layer along a user-selected one of the linear rows of hole members.

12. The method of claim 10 further comprising the step of the forming the polymer coating layer to include a plurality of micro-ribs or micro-nubs to inhibit a lateral flow of a liquid or fluid substance across the polymer coating layer.

13. The method of claim 10 further comprising the step of forming the polymer coating layer to include a plurality of microparticles to inhibit a lateral flow of a liquid or fluid substance across the polymer coating layer.

14. The method of claim 10 further comprising the step of forming at least one of the polymer coating layer and the paper mask layer to include a plurality of equally spaced markings adapted to provide a user a measurement aid or tool.

\* \* \* \* \*